(12) United States Patent
Yun (10) Patent No.: US 12,402,551 B2
(45) Date of Patent: Sep. 2, 2025

(54) SYSTEM AND METHOD FOR SUPPORTING FARMING ACTIVITY DECISION-MAKING BASED ON ENVIRONMENTAL IMPACT ASSESSMENT

(71) Applicant: SHERPA SPACE INC., Daejeon (KR)

(72) Inventor: Choa Mun Yun, Daejeon (KR)

(73) Assignee: SHERPA SPACE INC., Daejeon (KR)

( * ) Notice: Subject to any disclaimer, the term of this patent is extended or adjusted under 35 U.S.C. 154(b) by 381 days.

(21) Appl. No.: 17/929,736

(22) Filed: Sep. 5, 2022

(65) Prior Publication Data

US 2023/0309436 A1    Oct. 5, 2023

(51) Int. Cl.
*A01B 79/00*    (2006.01)
*A01B 79/02*    (2006.01)
*G01W 1/10*    (2006.01)
*G06Q 50/02*    (2012.01)

(52) U.S. Cl.
CPC .......... *A01B 79/005* (2013.01); *A01B 79/02* (2013.01); *G01W 1/10* (2013.01); *G06Q 50/02* (2013.01)

(58) Field of Classification Search
CPC ....... A01B 79/005; A01B 79/02; G01W 1/10; G06Q 50/02
See application file for complete search history.

(56) References Cited

U.S. PATENT DOCUMENTS

| 9,292,796 | B1* | 3/2016 | Mewes | G06N 20/00 |
| 2016/0073573 | A1 | 3/2016 | Ethington | |
| 2019/0180289 | A1 | 6/2019 | Klavins | |
| 2020/0027096 | A1* | 1/2020 | Cooner | G06Q 40/04 |
| 2021/0224927 | A1 | 7/2021 | Perry | |

FOREIGN PATENT DOCUMENTS

| CN | 113657751 A | 11/2021 |
| JP | 2020-149652 A | 9/2020 |
| KR | 10-2018-0052923 A | 5/2018 |
| KR | 10-2021-0029893 A | 3/2021 |
| KR | 102285300 B | 7/2021 |

OTHER PUBLICATIONS

KR OA dated Nov. 22, 2023.
EPO ESSR dated Jun. 2, 2023.

* cited by examiner

*Primary Examiner* — Elias Desta
(74) *Attorney, Agent, or Firm* — Harvest IP Law, LLP (57) ABSTRACT

A farming activity decision-making system based on environmental impact assessment and a method for providing the same are disclosed. The farming activity decision-making system based on environmental impact assessment and the method for providing the same can provide farming guides for farming activities for meteorological environments and pest control, in which environmental assessment/cost assessment have been reflected, provide rewards for farming activities reflecting provided farming guides, and utilize provided farming guides as eco-friendly certification data for crops.

14 Claims, 6 Drawing Sheets

SYSTEM AND METHOD FOR SUPPORTING FARMING ACTIVITY DECISION-MAKING BASED ON ENVIRONMENTAL IMPACT ASSESSMENT

BACKGROUND OF THE INVENTION

Field of the Invention

The present invention relates to a system and method for supporting farming activity decision-making based on environmental impact assessment, and more particularly, to a system and method for supporting farming activity decision-making based on environmental impact assessment, which can present, to farmers, a plurality of farming guides in stages for the entire cycle of farming using a climate model for predicting changes in weather environments and a pest control model for preventing and controlling damage by diseases and pests, provide environmental and cost assessment results along with the farming guides as a reference for farmers to select a farming guide, and induce eco-friendly farming by paying a predetermined reward to a farmer who has selected environmental farming.

Description of the Related Art

Although various measures through acquisition of information on environments such as weather and damage caused by pests are very important in agriculture, there is little or no exchange of information related to the conventional farming business, or even if there is information exchange, it tends to occur only in villages where the farming business is carried out together or in a limited area within a certain range.

Therefore, acquisition of information required by the agricultural business operators is merely following information obtained empirically in the past, and thus there is an increasing number of cases in which agriculture fails because it fails to adapt to circumstances, weather and the like related to the agricultural business or to take appropriate measures against the damage caused by pests.

As technology for supporting decision-making in farming activities, a system for supporting decision-making in agriculture is disclosed in Korean Patent No. 10-2285300 (Prior Art 1).

Prior art 1 provides agricultural consulting, agricultural decision-making support information services, agricultural guidance support information services for rural guidance organizations, agricultural policy decision support information services, and agricultural weather portal services using a specialized Internet website. However, there is a problem in that it is impossible to provide information such as eco-friendly crop certification for produced crops or the environmental impact due to carbon reduction and costs required for farming activities.

US patent application publication US2021/0224927 (Prior Art 2) discloses a technology for inducing modification of farming activities by estimating carbon emission reduction for farming activities. Prior art 2 presents a user with farming activities with appropriate carbon emission based on land or environment.

However, prior art 2 only focuses on the amount of carbon emitted through farming activities and does not take into account the cost required for carbon emission reduction, and thus is not suitable for areas (or countries) where small-scale or intensive farming is performed.

SUMMARY OF THE INVENTION

Therefore, the present invention has been made in view of the above problems, and it is an object of the present invention to provide guides for farming activities suitable for a region and time in consideration of weather changes and expected occurrence schedules of damage by diseases and pests, thereby helping farmers escape from unscientific farming based on simple empirical rules and fostering more rational and productive farming.

It is another object of the present invention to provide a plurality of guides for farming activities along with environmental and cost assessment results to help users select farming activities from various viewpoints.

It is a further object of present invention to provide users with direct or indirect compensation according to their choices such that more users select environmental farming activities.

In accordance with the present invention, the above and other objects can be accomplished by the provision of system for supporting farming activity decision-making based on environmental impact assessment, including: a scheduler for generating a plurality of farming guides for an entire cycle of farming using a climate model for predicting changes in weather environments and a pest control model for providing recipes for prevention and treatment of damage by diseases and pests; an assessor for assessing the plurality of the farming guides using an environmental assessment model and a cost assessment model; and a provider for providing the farming guides including assessment results of the assessor to a farmer terminal.

In an embodiment, the system may further include a compensator for providing a reward corresponding to environmental assessment results to a farmer when any one of the farming guides to which assessment has been applied is selected.

In an embodiment, the system may further include a growth controller for controlling cultivation environments of crops on the basis of the selected farming guide.

In an embodiment, the assessor may further assess the plurality of farming guides generated by the scheduler using a cost assessment model.

In an embodiment, the assessor may additionally receive weights for an environmental assessment result and a cost assessment result, and the scheduler may sort the farming guides to which the weights have been applied and provide the farming guides to the farmer terminal.

In an embodiment, the system may further include a monitor for checking whether farming activities in accordance with the selected farming guide have been performed or the cultivation environment has been controlled by the growth controller using sensor information collected from monitoring sensors installed in a cultivation facility.

In an embodiment, the monitoring sensors may include at least one of a pH sensor for measuring the acidity of a nutrient solution for growing crops, a water quality sensor for measuring a contamination level of a waste nutrient solution, a relay sensor for measuring electricity usage of a cultivation facility, and a flow rate sensor for measuring water usage.

In accordance with another aspect of the present invention, there is provided a method for supporting farming activity decision-making based on environmental impact assessment, including: generating, by a scheduler of a system for supporting farming activity decision-making, a plurality of farming guides for an entire cycle of farming using a climate model for predicting changes in weather environments and a pest control model for providing recipes for prevention and treatment of damage by diseases and pests; assessing, by an assessor of the system for supporting farming activity decision-making, the plurality of the farming guides using an environmental assessment model and a cost assessment model; and providing, by a provider of the system for supporting farming activity decision-making, the farming guides including assessment results of the assessor to a farmer terminal.

In another embodiment, the method may further include providing, by a compensator of the system for supporting farming activity decision-making, a reward corresponding to environmental assessment results to a farmer when any one of the farming guides to which assessment has been applied is selected.

In another embodiment, the method may further include controlling, by a growth controller of the system for supporting farming activity decision-making, cultivation environments including at least one of an intensity of radiation, a light wavelength, temperature, humidity, ventilation, and a nutrient solution composition ratio of a cultivation facility on the basis of the selected farming guide.

In another embodiment, the method may further include additionally receiving, by the assessor, weights for an environmental assessment result and a cost assessment result, and sorting the farming guides to which the weights have been applied and providing the farming guides to the farmer terminal by the scheduler.

In another embodiment, the method may further include checking, by a monitor of the system for supporting farming activity decision-making, whether farming activities in accordance with the selected farming guide have been performed or the cultivation environment has been controlled by the growth controller using sensor information collected from monitoring sensors installed in a cultivation facility.

In another embodiment, the method may further include adjusting, by the monitor, the reward previously provided by the compensator by reflecting a checking result in the reward.

The present invention contributes to establishment of eco-friendly farming by providing a plurality of coping guides for a specific farming activity throughout the entire cycle of farming and paying a predetermined reward to a farmer who has selected and performed an eco-friendly farming activity.

In other words, farmers can indirectly save various purchasing budgets or create direct profits through CDM credit using Clean Points rewarded by a system for supporting farming activity decision-making, set high farm-product prices if they are recognized as environmental farming practitioners by a certificate of CDM credit, and indirectly reduce operating costs since the title of environmental agricultural practitioner itself works as a marketing point.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will be described in detail with reference to the accompanying drawings such that those skilled in the art can easily implement the embodiments. It should be understood, however, that there is no intent to limit the embodiments to the particular forms disclosed, but on the contrary, the embodiments should be construed as including all modifications, equivalents, and alternatives falling within the spirit and scope of the embodiments.

When an element is "coupled" or "connected" to another element, it should be understood that a third element may be present between the two elements although the element may be directly coupled or connected to the other element.

The terms used in the description of the present invention are merely used in order to describe particular embodiments, and are not intended to limit the scope of the present invention. An element described in the singular form is intended to include a plurality of elements unless the context clearly indicates otherwise.

In the specification of the present invention, it will be further understood that the terms "comprises" and "includes" specify the presence of stated features, integers, steps, operations, elements, components, or combinations thereof, but do not preclude the presence or addition of one or more other features, integers, steps, operations, elements, components, or combinations thereof.

The term "module" as used herein means a unit that processes a specific function or operation, which may mean hardware, software, or a combination of hardware and software.

The present invention relates to a system for supporting farming activity decision-making based on environmental impact assessment and a method for providing the same, which can reflect environmental assessment/cost assessment in farming guides for farming activities with respect to weather environments and pest control, provide the farming guides, provide rewards for farming activities reflecting the provided farming guides, and use the provided farming guides as eco-friendly certification data.

Figure 1:
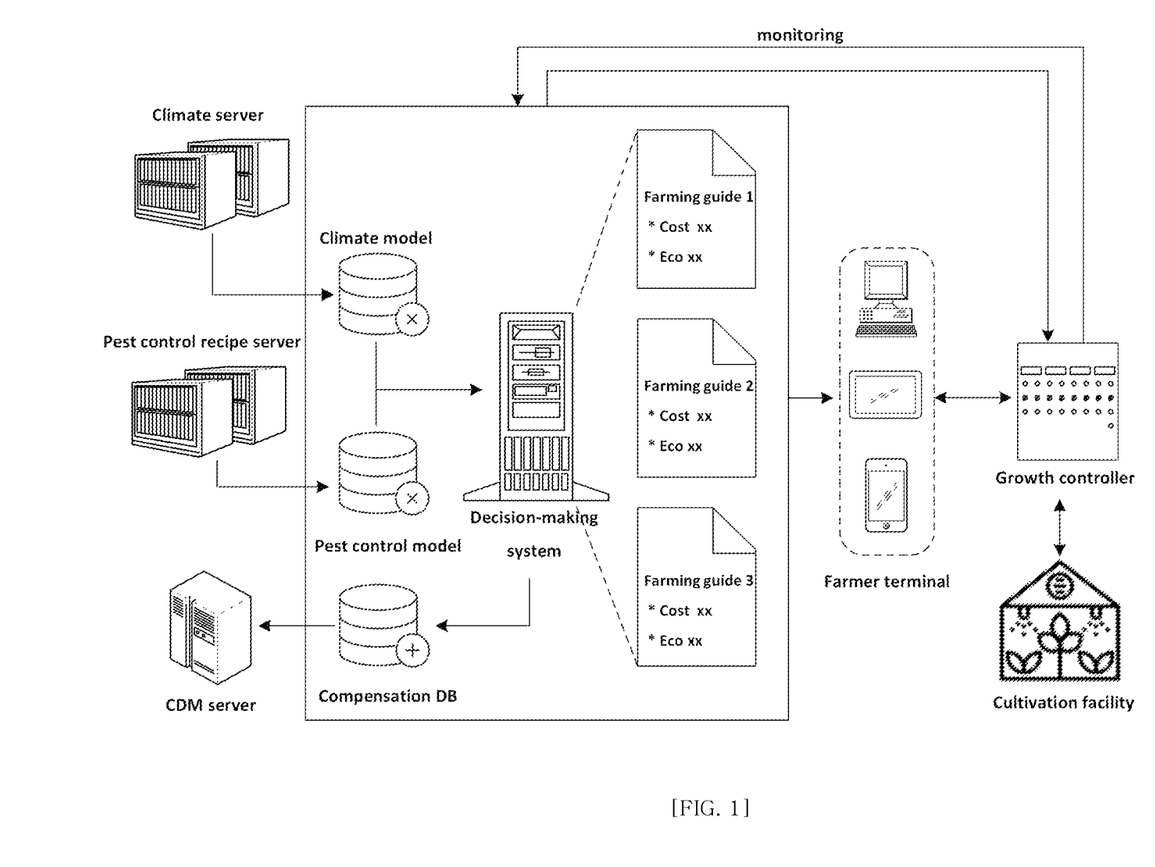
FIG. 1 is a schematic configuration diagram of a system for supporting farming activity decision-making according to an embodiment.

FIG. 1 is a schematic configuration diagram of a system for supporting farming activity decision-making according to an embodiment.

Referring to FIG. 1, the system for supporting farming activity decision-making based on environmental impact assessment according to an embodiment provides farming guides for the entire cycle of farming from selection of crop varieties to harvest and sales to a farmer terminal using a climate model for predicting weather changes in a designated area and a pest control model for providing a specific pest control recipe for identified specific damage by diseases and pests.

In all embodiments below, including the present embodiment, the farming guide refers to specific implementation methods and related information for farming activities throughout the entire cycle from selection of crops to shipment, such as selection of crop variety, selection of seeds, selection of a farming place (outdoors or green house), composition of soil conditions, setting of sowing timing, selection of fertilizers and application timing, selection of pesticides and application timing, setting of irrigation timing and amount of irrigation, setting of required temperature, required humidity, harvesting time, and shipping time, introduction of farming equipment, and selection of farming equipment. In addition, in all embodiments below, including the present embodiment, the term "farming equipment" will be understood as a concept including green houses, agricultural solar panels, seedling facilities, various agricultural machines, and various agricultural materials.

The system for supporting farming activity decision-making does not provide farmers with a single farming guide including only a cultivation method, but provides a plurality of farming guides as much as possible, each farming guide including cost assessment results (or cost information) and environmental assessment results (or environmental impact index or life cycle assessment (LCA) application results), to guide farmers such that they can select a farming method that prioritizes cost or select a farming method that prioritizes the environment.

The system for supporting farming activity decision-making may pay a predetermined reward corresponding to environmental assessment of a farming guide selected by a farmer to the farmer.

The farmer may execute farming activities according to the selected farming guide, or an additionally provided growth controller may control various growth devices provided in a cultivation facility according to the farming guide provided by the system for supporting farming activity decision-making.

Results of farmer's farming activities or results of farming activities of various growth devices through the growth controller may be monitored by various sensors installed in the cultivation facility. In addition, the system for supporting farming activity decision-making may pay a predetermined reward to a farmer according to results of regular monitoring or may apply a penalty to a reward paid in advance.

Embodiment 1

Figure 2:
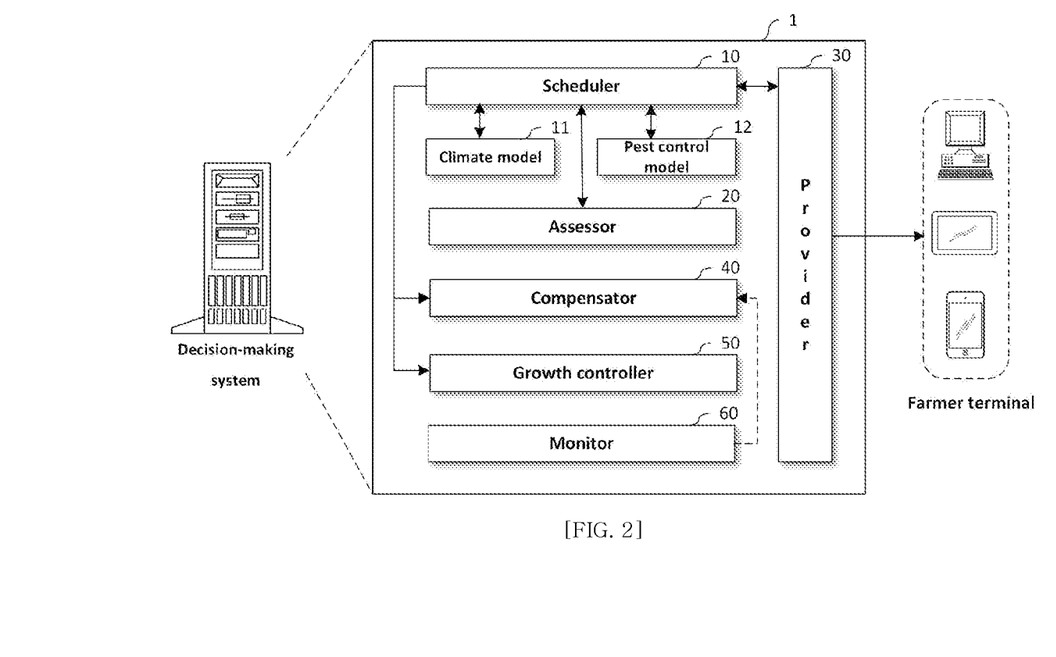
FIG. 2 is a block diagram of the system for supporting farming activity decision-making according to an embodiment.

FIG. 2 is a block diagram of a system for supporting farming activity decision-making according to an embodiment.

Referring to FIG. 2, the system for supporting farming activity decision-making based on environmental impact assessment according to embodiment 1 includes a scheduler 10, an assessor 20, and a provider 30, and may further include a compensator 40, a growth controller 50, and a monitor 60.

The scheduler 10 generates a plurality of farming guides for the entire cycle of farming from selection of crop varieties to harvest and sales using a climate model 11 for predicting changes in weather environments and a pest control model 12 for providing recipes for prevention and treatment of damage by diseases and pests.

The climate model 11 predicts change in the weather in a designated area using past time-series weather information on the designated area and a weather forecast provided from an external weather server (shown in FIG. 1) such as a meteorological administration. Prediction of weather change may be performed on a weekly and/or monthly basis.

In the past, sowing was performed at a time empirically determined rather than being based on systematic weather forecasting. However, since the earth's climate is constantly changing and unexpected climate changes have been frequently encountered in recent years, it is required to determine a sowing time and select crop variety on the basis of more scientific information.

The scheduler 10 generates, as a farming guide, information about crops expected to have a more successful harvest at the current time in the corresponding area this year, and a sowing time of specific crops selected by a farmer at which more successful cultivation is expected to be achieved in consideration of weather forecasts provided by the climate model 11. When a farming guide is generated using weather forecasts provided by the climate model 11, if the current time is September and a farmer is located in Cheongwon, the generated farming guide can inform the farmer that the best crops selectable under September weather conditions in Cheongwon are strawberries, barley, canola, and garlic.

The pest control model 12 may have information on damage by diseases and pests expected to occur at the present time on crops being grown as a database constructed in advance or may receive the information from an external pest control recipe server (shown in FIG. 1). In addition, the pest control model 12 may directly determine the type and progress of currently occurring damage by diseases and pests using images of crops captured by a camera provided in a cultivation facility, or may receive information on damage by diseases and pests determined by a separate analyzer (not shown).

The pest control model 12 provides, to the scheduler 10, prevention recipes for preparing for damage by diseases and pests expected to occur or treatment recipes for treating currently occurring damage by diseases and pests. Farmers can prevent damage by diseases and pests which may occur in advance or rapidly treat damage by diseases and pests which has occurred by referring to farming guides including treatment recipes or pest control recipes. Examples of farming guides generated using recipes of the pest control model 12 may include an appropriate temperature and an appropriate temperature maintenance period for preventing disease-and-pest damage A. In addition, other examples of farming guides include the names of pesticides (pesticide a, pesticide b, and pesticide c), appropriate application amounts, and application time for curing the initial stage of disease-and-pest damage B.

The assessor 20 applies an environmental assessment model to each of a plurality of farming guides generated by the scheduler 10 and provides assessment results to the scheduler 10 such that the assessment results are added to the farming guides.

The provider 30 provides the farming guides including the assessment results of the assessor 20 to a farmer terminal through a wired or wireless communication network.

In all embodiments of the present invention, the environmental assessment model means an algorithm for assessing the impacts of each of execution stages (or a farming recipe in each execution stage) in the entire cycle of crop cultivation, such as selection of crop varieties, sowing, application of pesticides, provision of fertilizers, temperature/humidity control, introduction of farming equipment, selection of farming equipment, and harvest and shipment, on the environment by predetermined items and weights. Examples of the environmental assessment model may include life cycle assessment (LCA) and political, economic, social and technological analysis (PEST).

LCA is a technique for quantifying the use of energy and mineral resources and resulting environmental loads on air, water, and soil in all processes of a product or a system, including raw material collection, processing, assembly, transportation, use, and disposal, and assessing potential adverse environmental effects caused thereby, and is used to assess adverse effects on the environment throughout the entire process (or the entire cycle) of farming in the present invention.

By applying LCA to the field of agriculture, it is possible to assess which non-environmental raw materials are used and how much carbon is emitted for manufacture, production, and supply of agricultural machinery, electricity, pesticides, fertilizers, water, etc. that are used in each process of crop production.

In addition, by applying LCA to the field of agriculture, it is possible to derive assessment information such as crops and sowing timing which can reduce the use of pesticides or fertilizers through safe cultivation, eco-friendly pesticides, dilution rates of pesticides which can satisfy both treatment and the environment at the same time, and a supply amount of water for satisfying both growth and the environment at the same time.

PEST serves to analyze the influence of political, economic, social, technological, legal and environmental factors on business. Here, environmental factors include issues related to carbon emission, sustainability of carbon emission, social responsibility, ethical systems of crops, preparation for climate change and pollution, environmental laws, etc.

Figure 3:
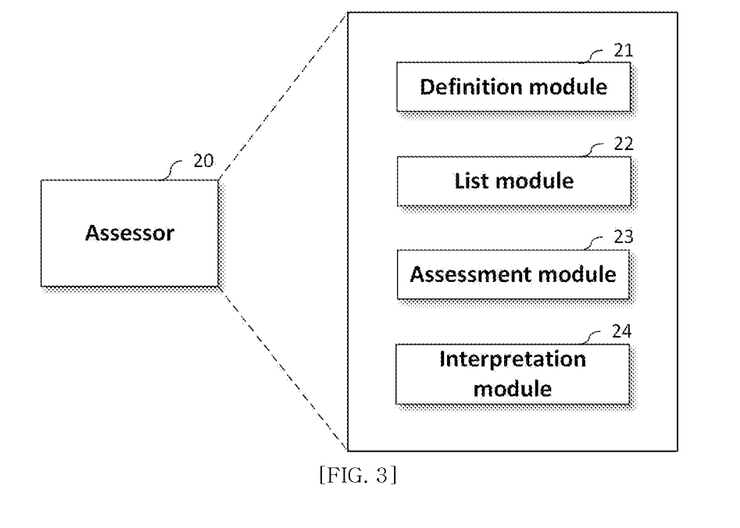
FIG. 3 is a block diagram of a case in which an LCA analysis model is applied to an assessor of the system for supporting farming activity decision-making according to an embodiment.

FIG. 3 is a block diagram in a case in which an LCA analysis model is applied to the assessor of the system for supporting farming activity decision-making according to an embodiment.

Referring to FIG. 3, the assessor 20 for applying LCA may include a definition module 21 for defining the goal and scope of an assessment target, a life cycle inventory (LCI) list module 22 for listing all processes constituting the assessment target, an assessment module 23 for performing life cycle impact assessment (LCIA) for each listed process, and a life cycle interpretation module 24 for checking and verifying assessment results.

The definition module 21 defines a range of environmental impacts caused by farming activities with respect to farming guides provided by the scheduler 10.

The LCI list module 22 collects data based on the range defined by the definition module 21 and constructs a quantitative input/output list.

For example, the LCI list module 22 may be configured to, in the case of pesticides and chemical fertilizers, quantify and analyze physical input and output, such as input amounts and discharge routes of raw agents and active ingredients, electricity and fuel (diesel, gasoline, kerosene, etc.) consumption per farmhouse, air emissions when fuel is used (combusted), and an input amount by type of eco-friendly farming material and organic fertilizer. Crops generally absorb carbon dioxide and discharge oxygen during the cultivation process, and a carbon neutral factor is applied because the carbon dioxide concentration does not have a long-term effect on farming activities.

The assessment module 23 assesses the impact on the environment for each factor by processing information of each list and assesses a level of damage to an end point.

The assessment module 23 may use, as environmental impact assessment factors, at least one of carbon output, acidification potential, eutrophication potential, photochemical ozone creation potential, human toxicity (cancer, non-cancer, and reference pollutants), aquatic ecotoxicity potential, marine aquatic ecotoxicity potential, terrestrial ecotoxicity potential, climate change, stratospheric ozone depletion, photo-oxidant formation, impacts of land use (land competition), resource consumption (fossil fuel, mineral resources, biological resources), urban air pollution, indoor air pollution, global warming, ozone layer depletion, waste, noise, and ecotoxicity.

The life cycle interpretation module 24 interprets execution results of the LCI list module 22 or the assessment module 23 and verifies whether an error is included in the execution results. In addition, the life cycle interpretation module 24 may calculate execution results of the assessment module 23 as numerical values and provide the numerical values. Verification of whether an error is included may be performed using at least one of completeness check, consistency check, and sensitivity check.

In the completeness check, it is checked whether information derived by the LCI list module 22 and the assessment module 23 corresponds to the range set in the definition module 21 and thus environmental issues have occurred. If specific data has been excluded or incomplete, it is determined whether to perform reassessment according to whether the data corresponds to the predefined range.

In the consistency check, it is checked whether the method, procedure, and data processing used in the assessment module 23 have been consistently performed.

In the sensitivity check, results of sensitivity and uncertainty determined in the LCI list module 22 and the assessment module 23 are examined, and when input data values are changed, cost assessment results may be further included in each farming guide.

Meanwhile, the assessor 20 may apply a cost assessment model to the plurality of farming guides provided by the scheduler 10 and further include cost assessment results in each farming guide.

For example, when farming guide A is a treatment recipe for pest control, farming guide 1 regarding pesticide prescription a, farming guide 2 regarding pesticide prescription b, and farming guide 3 regarding pesticide prescription c may be provided. At this time, since the cost assessment model is further applied by the assessor 20 in addition to the environmental assessment model, farming guide 1 may include pesticide prescription a, environmental impact index 8 (when the highest score is 10), and cost index 5 (when the highest score is 10), farming guide 2 may include pesticide prescription b, environmental impact index 4 (when the highest score is 10), and cost index 9 (when the highest score is 10), and farming guide 3 may include pesticide prescription c, environmental impact index 5 (when the highest score is 10), and cost index 7 (when the highest score is 10).

As another example, when farming guide B is a treatment recipe for preventing pests, farming guide 1 for proposing application of pesticides, farming guide 2 for proposing temperature control, and farming guide 3 for proposing use of natural enemies may be provided. At this time, since the cost assessment model is further applied by the assessor 20 in addition to the environmental assessment model, farming guide 1 may include pesticide prescription, environmental impact index 3 (when the highest score is 10), and cost index 7 (when the highest score is 10), farming guide 2 may include temperature adjustment to 28 degrees, environmental impact index 8 (when the highest score is 10), and cost index 4 (when the highest score is 10), and farming guide 3 may include use of natural enemy spiders, environmental impact index 9 (when the highest score is 10), and cost index 3 (when the highest score is 10).

In addition, the cost assessment model may assess required costs by dividing the same into direct costs and indirect costs. Direct costs refer to costs of purchasing equipment/materials that are directly expended for execution of farming guides and include, for example, costs for seeds, fertilizers, pesticides, vinyl, fuel and electric energy. Indirect costs include labor costs per input manpower, meal costs, laundry costs, washing costs, and time spent in farming activities that are indirectly expended for execution of farming guides.

Figure 4:
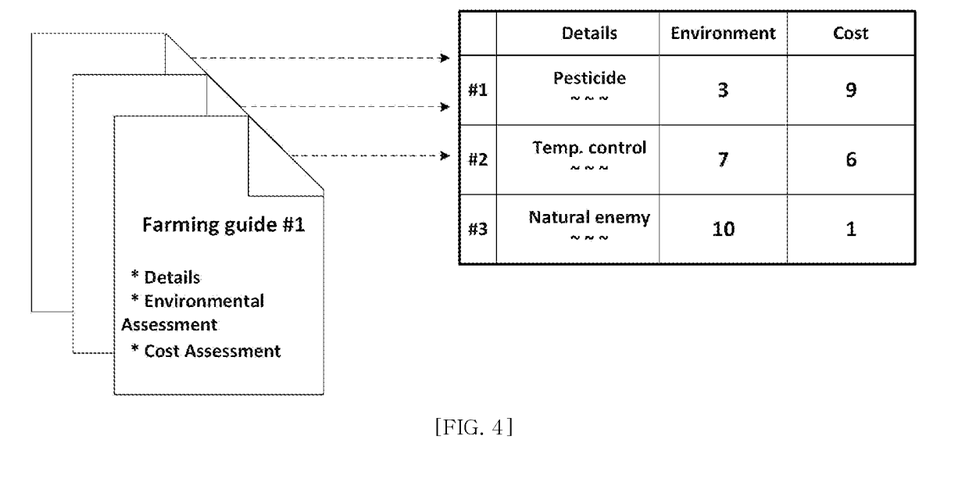
FIG. 4 shows an example of farming guides in which assessment results of the assessor of the system for supporting farming activity decision-making have been reflected according to an embodiment.

FIG. 4 shows an example of farming guides in which assessment results of the assessor of the system for supporting farming activity decision-making have been reflected according to an embodiment.

Referring to FIG. 4, the scheduler 10 presents a plurality of farming guides for the purpose of pest control, and specifically, provides application of pesticides, temperature control, and use of natural enemies as farming activities for pest control along with environmental assessment results and cost assessment results for each farming activity.

A farmer may select any one of the plurality of farming guides. The farmer may select a farming guide with priority given to environmental assessment or select a farming guide with priority given to cost assessment. For example, if damage by diseases and pests is in the stage of spread and a very large cultivated area has already been damaged, the farmer may preferentially select a farming guide proposing low-cost pesticides in order to cover the large area even if there are some adverse effects on the environment. If damage by diseases and pests is still in an incipient stage and is negligible, the farmer may select a farming guide that is more costly but does as little damage to the environment as possible.

When any one of the plurality of farming guides is selected, the compensator 40 provides a reward corresponding to environmental assessment results included in the selected farming guide, that is, a degree of impact on the environment when a farming activity according to the selected farming guide is performed, to a farmer.

In the embodiment shown in FIG. 4, the compensator 40 may provide the highest reward for a farming activity using natural enemies, provide the next highest reward for a farming activity of controlling temperature, and provide the lowest reward for a farming activity of applying pesticides.

Rewards offered by the compensator 40 to farmers may be provided in the form of points or credits that can be used as a kind of online currency. For example, the compensator 40 may provide farmers with Clean Points controlled by the operator of the system for supporting farming activity decision-making, and may set Clean Points based on standards established by an international standard organization such as ISO in order to ensure objectivity and equity.

Clean Points may be controlled and managed in a separate compensation database (not shown) and may be set as a kind of farming voucher such that they can be used to purchase goods, equipment, and job services required for farming activities.

The compensator 40 may differentially provide Clean Points according to a farming guide (or farming activity according to the guide) selected (or performed) by a farmer. That is, when a farming guide highly rated in the environmental assessment model has been performed, more Clean Points than those provided when a low-rated farming guide has been performed may be provided.

In addition, the compensator 40 may provide clean development mechanism (CDM) credit controlled by an international organization to farmers as rewards through the international organization. The CDM credit is a certificate for reduction of greenhouse gas emission compared to a standard BAU (Business-As-Usual) in an external greenhouse gas reduction project.

If a farmer selects or practices a farming guide with the least environmental impact or with a positive environmental impact among a plurality of farming guides, cultivation of crops according to the selected farming guide can be considered to have contributed to reduction of carbon emissions. Therefore, it is desirable that the compensator differentially provide CDM credit according to a farming guide (or farming activity according to the guide) selected (or executed) by a farmer, similar to Clean Points.

A farmer can trade credit with other entities or exchange the credit for cash or virtual currency by accessing a credit transaction server of the international organization using the system for supporting farming activity decision-making of the present invention by directly accessing the credit transaction server.

It can be ascertained from environmental assessment and cost assessment performed by the assessor 20 in the embodiment of FIG. 4 that temperature control is most advantageous in terms of environment and cost and then pesticide application and natural enemy use are advantageous.

A predetermined weight may be set in advance for each of environmental assessment and cost assessment in order to help a farmer preferentially and easily select a desired farming guide depending on the farmer's tendency or the type and severity of farming situations.

That is, the assessor 20 may additionally receive weights for environmental assessment and cost assessment and reflect the weights in assessment of each farming guide to derive assessment results. The scheduler 10 sorts the plurality of farming guides based on the assessment results in which the weights have been reflected and provides the same to the farmer.

Figure 5:
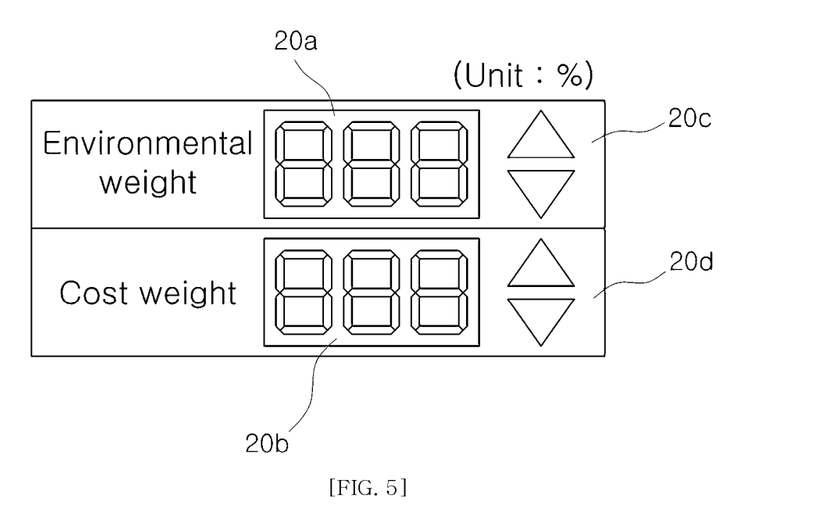
FIG. 5 shows an example of a user interface for setting weights in the system for supporting farming activity decision-making according to an embodiment.

FIG. 5 shows an example of a user interface for setting weights in the system for supporting farming activity decision-making according to an embodiment.

Referring to FIG. 5, the weight setting interface of the embodiment may include an environmental ratio display window 20*a* for displaying an assessment ratio in terms of the environment and a cost ratio display window 20*b* for displaying an assessment ratio in terms of cost. In addition, the weight setting interface may further include an environmental ratio adjustment button 20*c* for adjusting the ratio displayed on the environmental ratio display window 20*a* and a cost ratio adjustment button 20*d* for adjusting the ratio displayed on the cost ratio display window 20*b*.

Next, the growth controller 50 receives a selected farming guide from the scheduler 10 when a farmer selects the farming guide from among the plurality of farming guides provided by the scheduler 10, and controls the growing environment of crops according to the farming guide. The growth controller 50 may be included in the system for supporting farming activity decision-making of the present invention or may be provided separately from the system. The growth controller 50 may not be included in the system for supporting farming activity decision-making of the present invention in some cases.

The growth controller 50 controls at least one of the intensity of radiation, lighting time, and wavelength of a lighting device installed in a cultivation facility, adjusts the temperature of the cultivation facility by controlling a heater of the cultivation facility, adjusts the humidity of the cultivation facility by controlling at least one of a humidifier, a ventilator and a vent of the cultivation facility, adjusts water supply by controlling a valve of an irrigation pipe, adjusts the composition ratio or concentration of a nutrient solution by controlling a nutrient solution provider, or adjusts pesticide dilution or a pesticide application amount by controlling a pesticide sprayer.

The monitor 60 monitors whether control of farming activities or a cultivation environment has been executed according to a selected farming guide using information collected from various monitoring sensors disposed in a cultivation facility.

The monitoring sensors includes at least one of a pH sensor for measuring the acidity of a nutrient solution or water, a water quality sensor for measuring a contamination level of a waste nutrient solution, a relay sensor for measuring electricity usage of a cultivation facility, and a flow rate sensor for measuring water usage.

Whether or not a farmer has performed farming activities according to a selected farming guide may be reported to the monitor 60 in the form of an electronic farming log written by the farmer.

The monitor 60 may transmit monitoring results according to the determination to the compensator 40 such that a previous reward is adjusted.

That is, although the compensator 40 may immediately provide a reward to a farmer on the basis of a farming guide selected by the farmer, as described above, the compensator may provide a reward to the farmer according to whether actual farming activities have been carried out according to the farming guide or depending on a degree of execution of farming activities in accordance with the farming guide by reflecting the farming guide selected by the farmer and monitoring results provided by the monitor 60 together. In addition, the compensator 40 may provide a reward to the farmer on the basis of the farming guide selected by the farmer, and then reduce the reward or issue a penalty on the basis of monitoring results provided by the monitor 60.

When a farmer selects a farming guide considering the environment more instead of a farming guide corresponding to the cheapest method in terms of cost from among the plurality of farming guides proposed by the scheduler 10, it may seem to take a relatively large amount of cost in the short term, but in the long term, creation of better profits can be expected due to rewards by Clean Points and/or CDM credit and the marketing effect according thereto.

That is, firstly, the farmer can indirectly reduce various purchasing budgets through Clean Points rewarded by the system for supporting farming activity decision-making or directly create profits through CDM credit. Secondly, when the farmer is recognized as an environmental farming practitioner, the farmer can set high prices of agricultural products. Thirdly, the title of the eco-friendly farming practitioner itself acts as a marketing point, and thus operating costs can be indirectly reduced.

Embodiment 2

Embodiment 2 relates to a method of providing a farming guide based on environmental impact assessment according to another embodiment of the present invention.

Figure 6:
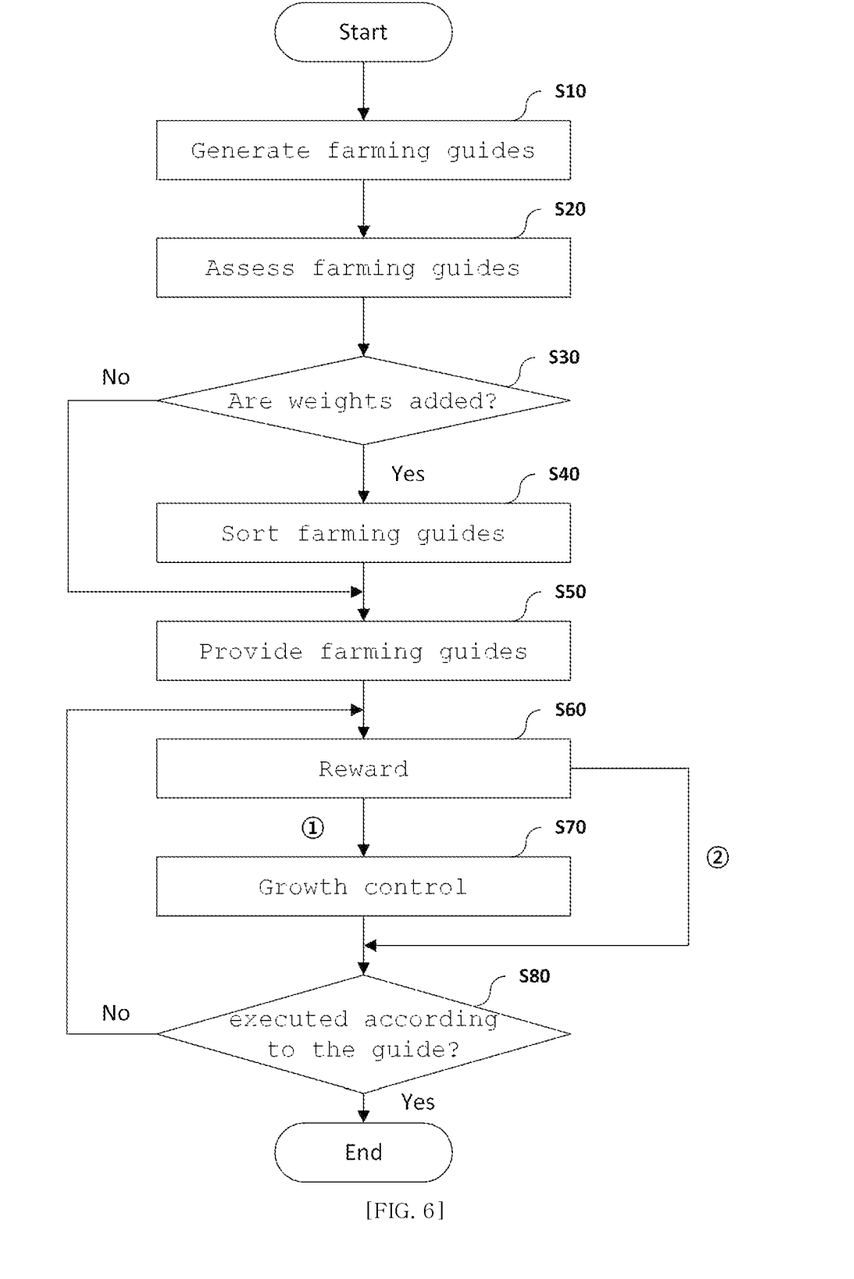
FIG. 6 is a flowchart of a method for supporting farming activity decision-making according to another embodiment.

FIG. 6 shows a flowchart of a method for supporting farming activity decision-making according to embodiment 2.

Referring to FIG. 6, a method for supporting farming activity decision-making based on environmental impact assessment according to the present invention includes a farming guide generation step S10, a farming guide assessment step S20, a farming guide provision step S50, and a compensation step S60, and may further include at least one of a weight adding step S30, a farming guide sorting step S40, a growth control step S70, and a monitoring step S80.

The method for supporting farming activity decision-making of embodiment 2 is implemented by the system for supporting farming activity decision-making based on the environmental impact assessment. The system for supporting farming activity decision-making includes a scheduler, an assessor, and a provider, and may further includes at least one of a compensator, a growth controller, and a monitor.

1. Farming Guide Generation Step S10

The scheduler generates a plurality of farming guides for the entire cycle of farming from selection of crop varieties to harvest and sales using a climate model for predicting changes in the weather environment and a pest control model for providing a recipe for prevention and treatment of damage by diseases and pests. The climate model and the pest control model are the same as those described in embodiment 1.

The assessor applies an environmental assessment model to each of the plurality of farming guides generated by the scheduler and adds assessment results to each farming guide. Further, the assessor may additionally and selectively provide a cost assessment model to each of the farming guides and add assessment results to each farming guide. The environmental assessment model and the cost assessment model are the same as those described in embodiment 1.

2. Farming Guide Assessment Step S20

The assessor applies an environmental assessment model to each of the plurality of farming guides generated by the scheduler and adds assessment results to each farming guide. Further, the assessor may additionally and selectively provide a cost assessment model to each of the farming guides and add assessment results to each farming guide. The environmental assessment model and the cost assessment model are the same as those described in embodiment 1.

3. Weight Adding Step S30

A predetermined weight may be set in advance for each of environmental assessment and cost assessment in order to help a farmer preferentially and easily select a desired farming guide depending on the farmer's tendency or the type and severity of farming situations.

That is, the assessor may additionally receive a weight for each of environmental assessment and cost assessment and reflect received weights in assessment of each farming guide to derive assessment results.

4. Farming Guide Sorting Step S40

When weights are additionally input, the scheduler sorts the plurality of farming guides on the basis of assessment results in which the weights have been reflected and provides the farming guides to the farmer.

If there is no additional weight input, steps S30 and S40 are omitted and the procedure proceeds to the following farming guide providing step.

5. Farming Guide Provision Step S50

The provider provides the plurality of farming guides in which the assessment results added by the assessor have been reflected to a farmer terminal through a wired or wireless communication network. The farmer may select any one of the plurality of farming guides, select a farming guide with priority given to environmental assessment, or select a farming guide with priority given to cost assessment.

6. Compensation Step S60

When any one of the plurality of farming guides is selected, the compensator provides, to the farmer, a reward corresponding to environmental assessment results included in the selected farming guide, that is, a degree of environmental impact when farming activities according to the selected farming guide have been performed. As a means of compensation, Clean Point and/or CDM credit as described in embodiment 1 may be used.

7. Growth Control Step S70

Growth control step S70 may be further included as a selectable step. When proceeding to branch ①, in growth control step S70, the growth controller receives a selected farming guide from the scheduler when the farmer selects the farming guide from among the plurality of farming guides provided by the scheduler and adjusts the cultivation environment by controlling various cultivation devices of a cultivation facility according to the provided farming guide.

Specifically, the growth controller controls at least one of the intensity of radiation, lighting time, and wavelength of a lighting device installed in the cultivation facility, adjusts the temperature of the cultivation facility by controlling a heater of the cultivation facility, adjusts the humidity of the cultivation facility by controlling at least one of a humidifier, a ventilator and a vent of the cultivation facility, adjusts water supply by controlling a valve of an irrigation pipe, adjusts the composition ratio or concentration of a nutrient solution by controlling a nutrient solution provider, or adjusts pesticide dilution or a pesticide application amount by controlling a pesticide sprayer.

When proceeding to branch ②, the farmer performs farming activities himself/herself according to the farming guide.

8. Monitoring Step S80

Monitoring step S80 may be further included as a selectable step. In monitoring step S80, the monitor monitors whether control of farming activities or the cultivation environment has been executed according to the selected farming guide using information collected from various monitoring sensors disposed in the cultivation facility. The monitoring sensors are the same as those described in embodiment 1.

The monitor analyzes the information collected from the monitoring sensors and determines whether the farmer has performed farming activities according to the selected farming guide or the growth controller has been properly controlled according to the selected farming guide using analysis results.

The monitor may transmit monitoring results according to determination to the compensator such that the previous reward is adjusted. The detailed compensation adjustment method is the same as described in embodiment 1.

Although the present invention has been described with reference to several embodiments of the present invention, those of ordinary skill in the art can understand that the present invention can be modified and changed in various manners without departing from the spirit and scope of the present invention described in the claims below.

In addition, the partial functions of the above-described device or system may be provided by being included in a computer-readable recording medium by tangibly implementing a program including instructions for implementing the same. A computer-readable recording medium may include program instructions, data files, data structures, etc. alone or in combination. Examples of the computer-readable recording medium include magnetic media such as hard disks, floppy disks and magnetic tapes, optical media such as CD-ROMs and DVDs, magneto-optical media such as floptical disks, and hardware devices specially configured to store and carry out program instructions, such as ROMs, RAMS, flash memories, and USB memories.

The present invention was derived in the course of performing an R&D project.

Assignment identification number: 1545024479

Assignment number: 421008-04

Department name: Ministry of Agriculture, Food and Rural Affairs, Ministry of Science and Technology Information and Communication, Rural Development Administration Specialized research and management institutions: Agriculture, Forestry and Food Technology Planning and Evaluation Institute, Smart Farm Research and Development Project Group Research project name: Smart farm multi-ministerial package innovation technology development project Research project name: Development of high-temperature and high-humidity smart greenhouse package model for export Contribution rate: 1/1

Name of project performing organization: Shelpa Space Co., Ltd.

Research period: 2022. Jan. 1~2022. Dec. 31

What is claimed is:

1. A system for supporting farming activity decision-making based on environmental impact assessment, comprising:

a scheduler for generating a plurality of farming guides for an entire cycle of farming using a climate model for predicting changes in weather environments and a pest control model for providing recipes for prevention and treatment of damage by diseases and pests;

an assessor for assessing the plurality of the farming guides using an environmental assessment model and a cost assessment model, wherein the environmental assessment model is an algorithm that evaluates an impact of each execution step of the plurality of farming guides on environment during the entire cycle of farming and generates an evaluation result in an environment impact index or degree, wherein the cost assessment model is an algorithm that calculates cost items required for executing the plurality of farming guides including cost for purchasing required equipment, material and fuel during the entire cycle of farming and generates a calculation result in a cost index or degree;

a provider for providing the plurality of farming guides including assessment results of the assessor to a farmer terminal;

a compensator for transmitting, to the farmer terminal, a reward point corresponding to the environmental impact index or degree of a selected farming guide selected from among the plurality of framing guides; and a growth controller for controlling a cultivation facility of crops based on the selected farming guide, wherein the growth controller performs, based on the selected farming guide, at least one of:

controlling intensity of radiation, lighting time, and wavelength of a lighting device installed in the cultivation facility, adjusting temperature of the cultivation facility by controlling a heater of the cultivation facility, adjusting humidity of the cultivation facility by controlling at least one of a humidifier, a ventilator and a vent of the cultivation facility, adjusting water supply by controlling a valve of an irrigation pipe, adjusting composition ratio or concentration of a nutrient solution by controlling a nutrient solution provider, and adjusting pesticide dilution or a pesticide application amount by controlling a pesticide sprayer.

2. The system for supporting farming activity decision-making based on environmental impact assessment according to claim 1, wherein the assessor additionally receives weights for the environment impact index or degree and the cost index or degree, and the scheduler sorts the plurality of farming guides to which the weights have been applied and provides the plurality of farming guides to the farmer terminal.

3. The system for supporting farming activity decision-making based on environmental impact assessment according to claim 1, wherein farming activities that are targets of the farming guides include at least one of crop variety selection, seed selection, sowing, irrigation, pesticide application, fertilizer supply, harvest and shipment, introduction of farming equipment, and selection of farming equipment.

4. The system for supporting farming activity decision-making based on environmental impact assessment according to claim 3, further comprising a monitor for checking whether farming activities in accordance with the selected farming guide have been performed and whether the cultivation facility has been controlled by the growth controller, by using sensor information collected from monitoring sensors installed in the cultivation facility.

5. The system for supporting farming activity decision-making based on environmental impact assessment according to claim 4, wherein the monitoring sensors include at least one of a pH sensor for measuring the acidity of a nutrient solution for growing crops, a water quality sensor for measuring a contamination level of a waste nutrient solution, a relay sensor for measuring electricity usage of a cultivation facility, and a flow rate sensor for measuring water usage.

6. The system for supporting farming activity decision-making based on environmental impact assessment according to claim 1, wherein the environmental assessment model assesses at least one of carbon emission, resource depletion, ozone layer depletion, acidification, eutrophication, photochemical oxide, human toxicity, freshwater ecotoxicity, seawater ecotoxicity, and soil ecotoxicity.

7. The system for supporting farming activity decision-making based on environmental impact assessment according to claim 1, wherein the reward point provided by the compensator includes clean development mechanism (CDM) credit.

8. A method for supporting farming activity decision-making based on environmental impact assessment, comprising:

generating, by a scheduler of a system for supporting farming activity decision-making, a plurality of farming guides for an entire cycle of farming using a climate model for predicting changes in weather environments and a pest control model for providing recipes for prevention and treatment of damage by diseases and pests;

assessing, by an assessor of the system for supporting farming activity decision-making, the plurality of the farming guides using an environmental assessment model and a cost assessment model, wherein the environmental assessment model is an algorithm that evaluates an impact of each execution step of the plurality of farming guides on environment during the entire cycle of farming and generates an evaluation result in an environment impact index or degree, wherein the cost assessment model is an algorithm that calculates cost items required for executing the plurality of farming guides including cost for purchasing required equipment, material and fuel during the entire cycle of farming and generates a calculation result in a cost index or degree;

providing, by a provider of the system for supporting farming activity decision-making, the plurality of farming guides including assessment results of the assessor to a farmer terminal;

transmitting, by a compensator of the system for supporting farming activity decision-making, a reward point corresponding to the environmental impact index or degree of a selected farming guide selected from among the plurality of framing guides; and controlling, by a growth controller of the system for supporting farming activity decision-making, a cultivation facility of crops based on the selected farming guide, wherein the growth controller performs, based on the selected farming guide, at least one of:

controlling intensity of radiation, lighting time, and wavelength of a lighting device installed in the cultivation facility, adjusting temperature of the cultivation facility by controlling a heater of the cultivation facility, adjusting humidity of the cultivation facility by controlling at least one of a humidifier, a ventilator and a vent of the cultivation facility, adjusting water supply by controlling a valve of an irrigation pipe, adjusting composition ratio or concentration of a nutrient solution by controlling a nutrient solution provider, and adjusting pesticide dilution or a pesticide application amount by controlling a pesticide sprayer.

9. The method for supporting farming activity decision-making based on environmental impact assessment according to claim 8, further comprising:

additionally receiving, by the assessor, weights for the environment impact index or degree and the cost index or degree; and sorting, by the scheduler, the plurality of farming guides to which the weights have been applied and providing the plurality of farming guides to the farmer terminal.

10. The method for supporting farming activity decision-making based on environmental impact assessment according to claim 8, wherein farming activities that are targets of the farming guides include at least one of crop variety selection, seed selection, sowing, irrigation, pesticide application, fertilizer supply, harvest and shipment, introduction of farming equipment, and selection of farming equipment.

11. The method for supporting farming activity decision-making based on environmental impact assessment according to claim 10, further comprising checking, by a monitor of the system for supporting farming activity decision-making, whether farming activities in accordance with the selected farming guide have been performed and whether the cultivation facility has been controlled by the growth controller, by using sensor information collected from monitoring sensors installed in the cultivation facility.

12. The method for supporting farming activity decision-making based on environmental impact assessment according to claim 11, wherein the monitoring sensors include at least one of a pH sensor for measuring the acidity of a nutrient solution for growing crops, a water quality sensor for measuring a contamination level of a waste nutrient solution, a relay sensor for measuring electricity usage of a cultivation facility, and a flow rate sensor for measuring water usage.

13. The method for supporting farming activity decision-making based on environmental impact assessment according to claim 12, further comprising adjusting, by the monitor, the reward point previously provided by the compensator by reflecting a checking result in the reward point.

14. The method for supporting farming activity decision-making based on environmental impact assessment according to claim 8, wherein the environmental assessment model assesses at least one of carbon emission, resource depletion, ozone layer depletion, acidification, eutrophication, photochemical oxide, human toxicity, freshwater ecotoxicity, seawater ecotoxicity, and soil ecotoxicity.

\* \* \* \* \*